US008756633B2

(12) United States Patent
Malik

(10) Patent No.: US 8,756,633 B2
(45) Date of Patent: Jun. 17, 2014

(54) METHODS, SYSTEMS, AND COMPUTER PROGRAM PRODUCTS FOR SELECTIVELY FACILITATING INTERNET CONTENT AND/OR ALERTS ON A TELEVISION CRAWL SCREEN, CLOSED CAPTION AND/OR PICTURE-IN-PICTURE AREA

(75) Inventor: Dale Malik, Atlanta, GA (US)

(73) Assignee: AT&T Intellectual Property I, L.P, Atlanta, GA (US)

( * ) Notice: Subject to any disclaimer, the term of this patent is extended or adjusted under 35 U.S.C. 154(b) by 1032 days.

(21) Appl. No.: 11/311,522

(22) Filed: Dec. 19, 2005

(65) Prior Publication Data
US 2007/0143796 A1    Jun. 21, 2007

(51) Int. Cl.
*G06F 13/00* (2006.01)
*G06F 3/00* (2006.01)
*H04N 5/445* (2011.01)

(52) U.S. Cl.
USPC ............. 725/43; 725/38; 725/40; 725/44; 725/47; 725/51; 725/60; 725/80; 725/81; 725/133; 725/141; 725/153; 709/231; 709/238

(58) Field of Classification Search
CPC .......... H04N 21/4886; H04N 21/4622; H04N 21/43615; H04N 21/43637; H04N 21/4126; H04N 5/445; H04N 5/44591; H04N 5/45
USPC ............... 725/32–36, 37–51, 60–61, 63–68, 725/110–111, 136, 138–139, 80–81, 133, 725/141, 153; 709/231, 238
See application file for complete search history.

(56) References Cited

U.S. PATENT DOCUMENTS

| 6,349,410 | B1 * | 2/2002 | Lortz | 725/110 |
|---|---|---|---|---|
| 6,816,201 | B1 * | 11/2004 | Fang et al. | 348/468 |
| 7,228,332 | B2 * | 6/2007 | Rust | 709/204 |
| 7,313,588 | B1 * | 12/2007 | Shotton et al. | 709/202 |
| 2001/0027475 | A1 * | 10/2001 | Givol et al. | 709/204 |
| 2003/0106072 | A1 * | 6/2003 | Soundararajan | 725/151 |
| 2004/0003402 | A1 * | 1/2004 | McKenna, Jr. | 725/46 |
| 2004/0034873 | A1 * | 2/2004 | Zenoni | 725/135 |

(Continued)

OTHER PUBLICATIONS

Allen et al, U.S. Appl. No. 10/108,177, filed Mar. 26, 2002 [incorporated by reference].*

(Continued)

*Primary Examiner* — Yassin Alata
(74) *Attorney, Agent, or Firm* — Guntin & Gust, PLC; Douglas Schnabel

(57) ABSTRACT

Content from a source, such as the Internet, may be displayed on a window on a television, such as a crawl screen, closed caption area, or picture-in-picture (PIP) area. This may allow a user to watch television and view both television content and Internet content simultaneously without the need to access another device, such as a laptop computer, personal digital assistant, or the like. For example, a user may connect a data processing system, such as a computer, to a video control module, e.g., digital video recorder (DVR) or other box used to control a television. The user may then access a tool bar, for example, provided with an Internet browser that runs on the data processing system to identify portions of one or more Web sites to be displayed on the television through the video control module. The video control module may also be configured to allow the user to interact with the Internet content displayed on the television through use of the television remote, for example.

18 Claims, 8 Drawing Sheets

(56) References Cited

U.S. PATENT DOCUMENTS

| | | | |
|---|---|---|---|
| 2004/0055018 A1* | 3/2004 | Stone | 725/113 |
| 2004/0078814 A1* | 4/2004 | Allen | 725/47 |
| 2004/0205492 A1* | 10/2004 | Newsome | 715/501.1 |
| 2006/0184989 A1* | 8/2006 | Slothouber | 725/110 |

OTHER PUBLICATIONS

U.S. Appl. No. 60/651,665.*

* cited by examiner

METHODS, SYSTEMS, AND COMPUTER PROGRAM PRODUCTS FOR SELECTIVELY FACILITATING INTERNET CONTENT AND/OR ALERTS ON A TELEVISION CRAWL SCREEN, CLOSED CAPTION AND/OR PICTURE-IN-PICTURE AREA

FIELD OF THE INVENTION

The present invention relates to communications networks, and, more particularly, to methods, systems, and computer program products for displaying content via communications networks.

BACKGROUND OF THE INVENTION

Communications networks are widely used for nationwide and worldwide communication of voice, multimedia and/or data. As used herein, communications networks include public communications networks, such as the Public Switched Telephone Network (PSTN), terrestrial and/or satellite cellular networks and/or the Internet.

The Internet is a decentralized network of computers that can communicate with one another via Internet Protocol (IP). The Internet includes the World Wide Web (WWW) service facility, which is a client/server-based facility that includes a large number of servers (computers connected to the Internet) on which Web pages or files reside, as well as clients (Web browsers), which interface users with the Web pages. The topology of the World Wide Web can be described as a network of networks, with providers of network services called Network Service Providers, or NSPs. Servers that provide application-layer services may be referred to as Application Service Providers (ASPs). Sometimes a single service provider provides both functions.

Television networks include both traditional broadcast networks as well as cable and satellite television networks. The combination of the Internet, wireless/wireline telecommunication networks, television networks, and the like may provide a user with many sources for content. Unfortunately, when a user is watching content on a television display, it may be difficult to check or review other content simultaneously.

SUMMARY OF THE INVENTION

According to some embodiments of the present invention, content from a source, such as the Internet, may be displayed on a window on a television, such as a crawl screen, closed caption area, or picture-in-picture (PIP) area. This may allow a user to watch television and view both television content and Internet content simultaneously without the need to access another device, such as a laptop computer, personal digital assistant, or the like. For example, a user may connect a data processing system, such as a computer, to a video control module, e.g., digital video recorder (DVR) or other box used to control a television. The user may then access a tool bar, for example, provided with an Internet browser that runs on the data processing system to identify portions of one or more Web sites to be displayed on the television through the video control module. The video control module may also be configured to allow the user to interact with the Internet content displayed on the television through use of the television remote, for example. In this regard, a user may select items using the remote and/or enter new information to be transmitted back to the Web site through data processing system. As an example, a user may be presented with a current bid price in a PIP area for an item being sold through an Internet auction. The user may then press the up-arrow on the television remote to increase the current bid price to generate a new bid. The new bid may be transmitted back to the Web site by pressing the enter key on the television remote.

Thus, in some embodiments of the present invention, content from a television signal source is displayed on a television monitor and content from a source other than the television signal source is displayed in a window on the television monitor.

In other embodiments, displaying the content comprises detecting the occurrence of an event and displaying the content from the source other than the television signal source responsive to detecting the occurrence of the event.

In other embodiments, the event is defined by a user.

In still other embodiments, displaying the content from the source other than the television signal source comprises crawling the content from the source other than the television signal source across the window.

In still other embodiments, displaying the content from the source other than the television signal source comprises displaying the content from the source other than the television signal source using Really Simple Syndication (RSS) as a format.

In still other embodiments, the content from the source other than the television signal source comprises at least one of audio, video, a World Wide Web (WWW) page, and an electronic mail/message.

In still other embodiments, an input is received via an interface associated with the window on the television monitor. An action is performed based on the received input.

In still other embodiments, performing the action comprises at least one of the following: operating a control on the television; providing the input to an application; and executing an application.

In still other embodiments, the source other than the television signal source comprises the Internet, the method further comprising downloading a plug-in that displays a content selection menu on an Internet browser, receiving a selection of content via the content selection menu, establishing a communication session on the Internet with the content source, and communicating the content to a video control module for display on the television monitor.

Although described primarily above with respect to method aspects of the present invention, it will be understood that the present invention may also be embodied as systems and computer program products.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of exemplary embodiments thereof when read in conjunction with the accompanying drawings, in which.

DETAILED DESCRIPTION OF EMBODIMENTS OF THE INVENTION

Figure 1:
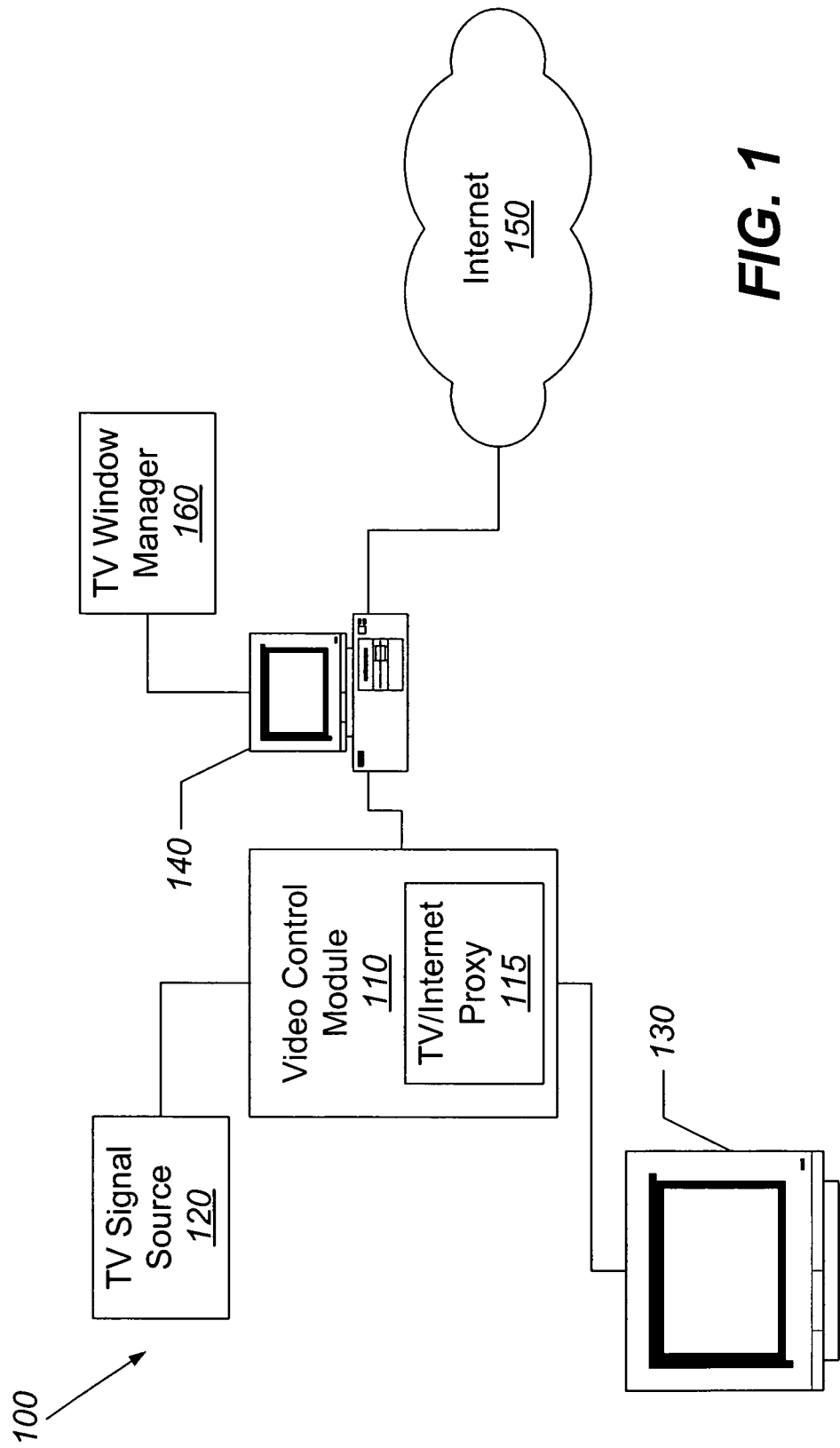
FIG. 1 is a block diagram that illustrates a communication network in accordance with some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

According to some embodiments of the present invention, content from a source, such as the Internet, may be displayed on a window on a television, such as a crawl screen, closed caption area, or picture-in-picture (PIP) area. This may allow a user to watch television and view both television content and Internet content simultaneously without the need to access another device, such as a laptop computer, personal digital assistant, or the like. For example, a user may connect a data processing system, such as a computer, to a video control module, e.g., digital video recorder (DVR) or other box used to control a television. Depending on the capabilities of the box used to control the television, various features may be provided. For example, if the user has a basic DVR or other black box and analog television capability, then the user may only be able to view Internet content on the television, but may not be able to send information back to a Web site through the television interface via the data processing system. If the user has, for example, a digital cable box with a built-in DVR, then bi-directional communication may be possible allowing the user to access the Internet using the television as an interface. If the user has Internet Protocol TV (IPTV) service, then the user's set top box may run a version of the Windows operating system, which may allow a connection to the data processing system using, for example, the Remote Desktop Protocol (RDP).

The user may access a tool bar, for example, provided with an Internet browser that runs on the data processing system to identify portions of one or more Web sites to be displayed on the television through the video control module or other black box. The video control module may also be configured to allow the user to interact with the Internet content displayed on the television through use of the television remote, for example. In this regard, a user may select items using the remote and/or enter new information to be transmitted back to the Web site through data processing system. As an example, a user may be presented with a current bid price in a PIP area for an item being sold through an Internet auction. The user may then press the up-arrow on the television remote to increase the current bid price to generate a new bid. The new bid may be transmitted back to the Web site by pressing the enter key on the television remote.

Thus, some embodiments of the present invention may provide users with a convenient interface for watching television while simultaneously viewing Internet content. This may be especially convenient in situations where a user does not wish to surf the Internet, but wishes to be kept apprised of events, such as sports scores, stock quotes, bid prices on Internet auctions, ticket availability for an event, and the like.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain or store the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

For purposes of illustration, embodiments of the present invention are described herein with respect to displaying Internet content and/or alerts on a portion of a television display, such as a crawl screen, closed caption area, and/or picture-in-picture (PIP) area. It will be understood, however, that the present invention may be embodied generally by displaying content on a television monitor from a source other than a television signal source. As used herein, content means information and experiences created by individuals, institutions, and/or technology to benefit audiences in venues that the audiences value.

Referring now to FIG. 1, an exemplary network architecture 100 for displaying Internet content and/or alerts on a television monitor in a crawl screen, close caption, and/or PIP area, in accordance with some embodiments of the present invention, comprises a video control module 110, e.g., digital video recorder (DVR) or other black box or set top box, that is coupled to a television signal source 120, such as, for example, a cable or satellite television network. As used herein, the video control module may be any video control and/or mixing device that has local IP connectivity whether over a physical network or an IEE 802.11 wireless Ethernet connection. The video control module 110 may be configured to display content from the television signal source 120 on a monitor 130. The video control module 110 is connected to a data processing system 140 that is coupled to a network 150. The connection between the video control module 110 and the data processing system 140 may be an Ethernet connection, wireless connection, or other type of direct or networked connection in accordance with various embodiments of the present invention. The network 150 may represent a global network, such as the Internet, or other publicly accessible network. The network 150 may also, however, represent a wide area network, a local area network, an Intranet, or other private network, which may not accessible by the general public. Furthermore, the network 150 may represent a combination of public and private networks or a virtual private network (VPN). The data processing system 140 is configured with a television window manager 160 that may facilitate the acquisition of content via the network 150, for example, for display on the television monitor 130 through the video control module 110. The video control module 110 further comprises a TV/Internet Proxy module 115 that may be configured to act as a translation and intelligent transfer agent. According to some embodiments of the present invention, the TV/Internet proxy module 115 may listen to an IP network connection with the data processing system 140 to await a television display request. The data sent by the television window manager 160 may be processed by the TV/Internet proxy module 115 and integrated into the video stream for the television monitor 130 so that the data is displayed in the appropriate window, such as a crawl screen, closed caption area, and/or PIP area.

In further embodiments of the present invention, the TV/Internet Proxy 115 may provide an interface for a user to submit information back to a Web site through the data processing system 140. For example, a user may use a television remote to provide input as described in greater detail below. The video control module 110 may be configured to listen for commands from the television window manager 160 and to take appropriate action. The television window manager may only listen to valid responses from the video control manager 110 that have been enabled. For example, if the data sent to the video control module 110 is encoded to have a response command, then the video control module 110 may look for those responses coming via, for example, the television remote control, and offer some type of confirmation before relaying the response back to the television window manager 160.

Although FIG. 1 illustrates an exemplary communication network, it will be understood that the present invention is not limited to such configurations, but is intended to encompass any configuration capable of carrying out the operations described herein.

Figure 2:
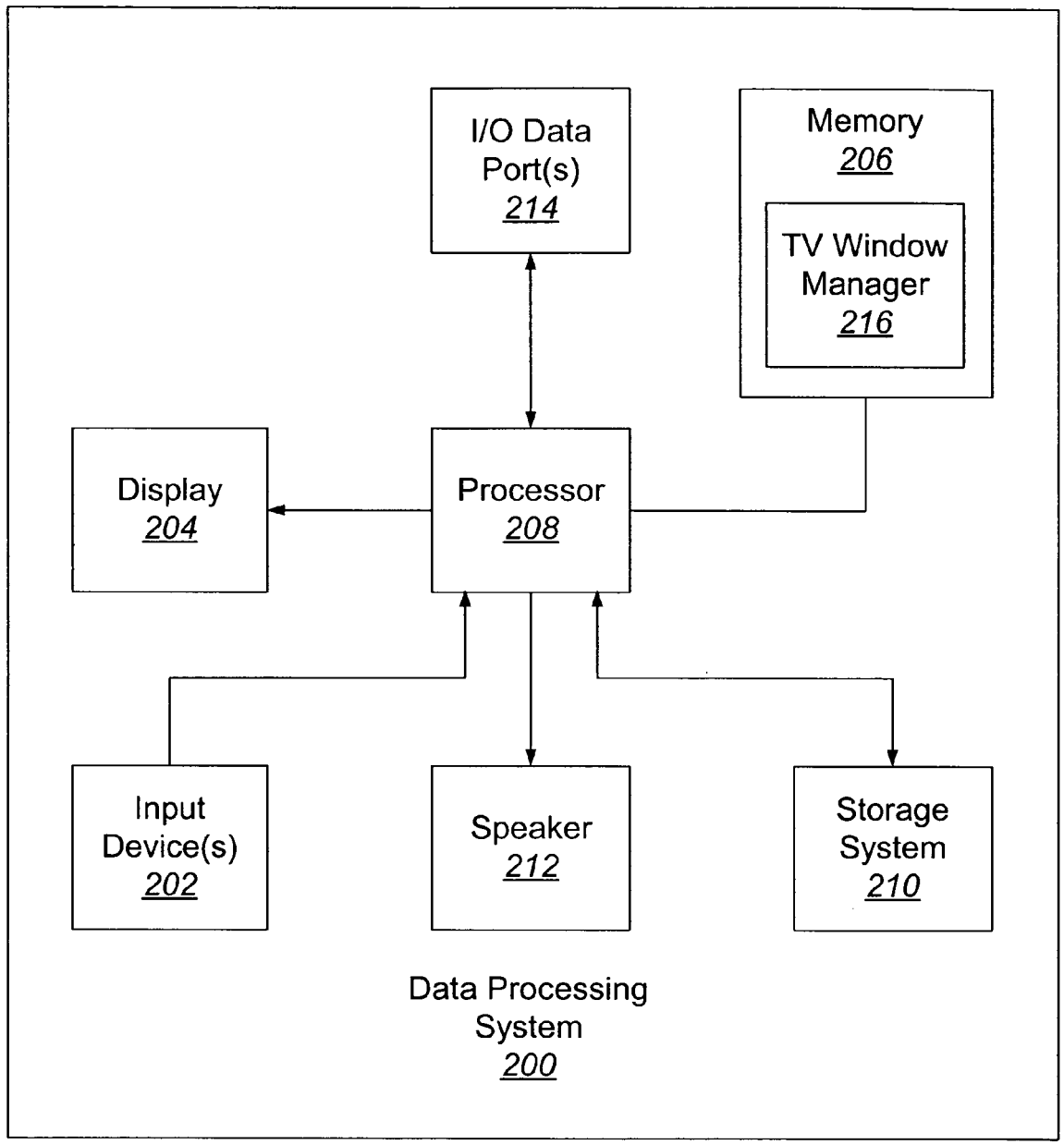
FIG. 2 illustrates a data processing system that may be used to facilitate the display of content on a television monitor from a source other than a television signal source in accordance with some embodiments of the present invention.

Referring now to FIG. 2, a data processing system 200 that may be used to implement the data processing system 140 of FIG. 1, in accordance with some embodiments of the present invention, comprises input device(s) 202, such as a keyboard or keypad, a display 204, and a memory 206 that communicate with a processor 208. The data processing system 200 may further include a storage system 210, a speaker 212, and an input/output (I/O) data port(s) 214 that also communicate with the processor 208. The storage system 210 may include removable and/or fixed media, such as floppy disks, ZIP drives, hard disks, or the like, as well as virtual storage, such as a RAMDISK. The I/O data port(s) 214 may be used to transfer information between the data processing system 200 and another computer system or a network (e.g., the Internet). These components may be conventional components, such as those used in many conventional computing devices, and their functionality, with respect to conventional operations, is generally known to those skilled in the art. The memory 206 may be configured with a television window manager 216 that may be used to obtain content from a source other than the television signal source 120 of FIG. 1 and to provide the content to the video control module 110 for display on a television monitor in accordance with some embodiments of the present invention. In some embodiments, the content may be Internet content and/or alerts that are selected by a user using an Internet browser interface. For example, the television window manager 216 may provide an Internet browser that includes a tool bar to allow the user to capture portions of a Web page for display on the television.

Figure 8:
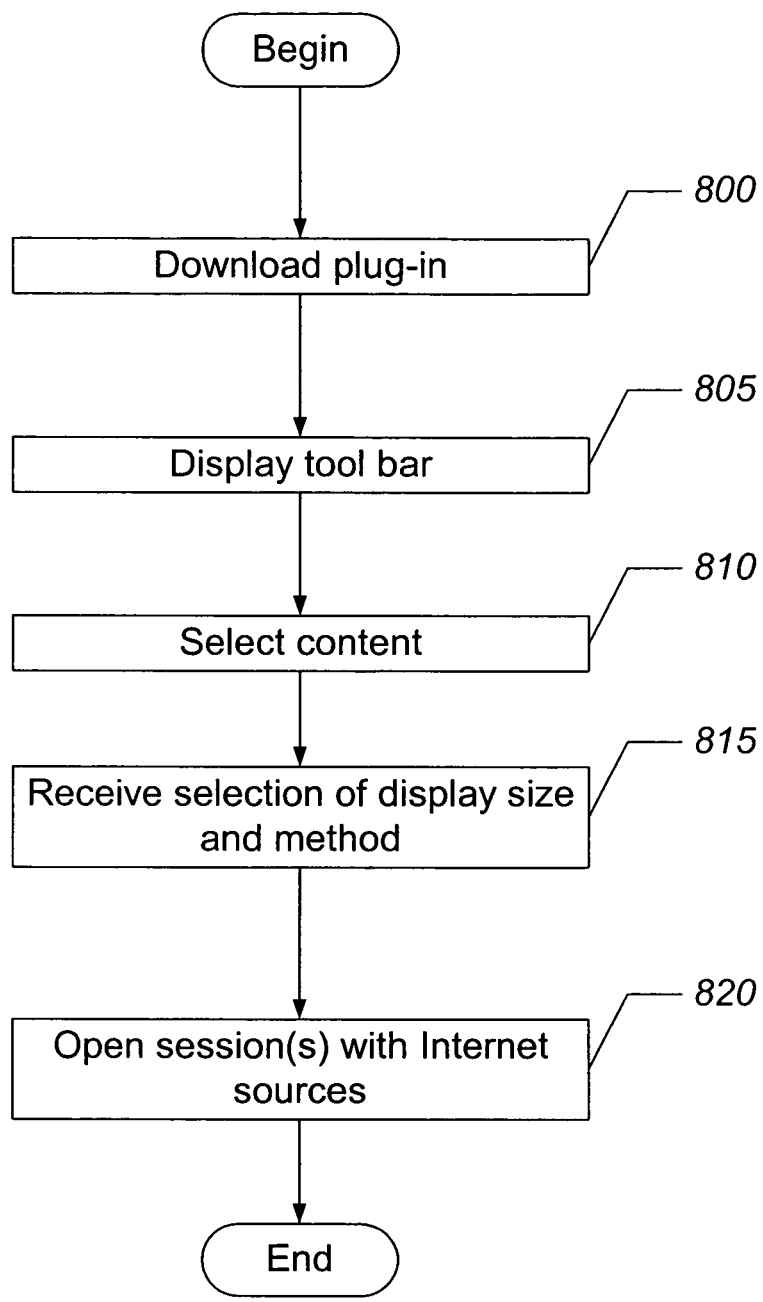

Referring now to FIG. 8, in some embodiments of the present invention, the television window manager 216 may allow a user to download a plug-in for an Internet browser at block 800. The plug-in may be written in a platform independent programming language, such as Java, for example. The plug-in may show a TV manager tool bar with the following capabilities at block 805: set-up, start, stop, show, add (capture), and delete. The set-up menu item may allow a user to choose the display size and method (i.e., placement location of the Internet content on the television display—picture-in-picture window, crawl screen window, closed caption window). Note that not all display locations may be suitable depending on the type of content to be displayed. The start and stop menu options allow a user to begin the display of content from the Internet, for example, on the television display and to stop the display of such content. The add and delete menu options allow a user to add content for display on the television display and delete content for display on the television display, respectively. The show menu option may display the content to be directed to the television in a pop window that mimics the window to be displayed on the television.

Thus, at block 810, a user may select content from the Internet, for example, for display on the television display. The user may use the set-up menu item at block 815 to select the display size and the particular window method (e.g., crawl screen, picture-in-picture window, closed caption window) for displaying the selected content. In response to invocation of the start menu option on the tool bar, the television window manager 216 opens session(s) with the Internet sources, for example, to extract the selected content and provide that content to the video control module 110 for display on the television display. Where a particular Web site requires a log in, such as an Internet auction site, for example, the user may need to provide the log in/account information to the television window manager 216 or allow the user to input such information through the video control module 110 using, for example, a television remote. Further examples of this functionality are described below in accordance with some embodiments of the present invention.

Figure 3:
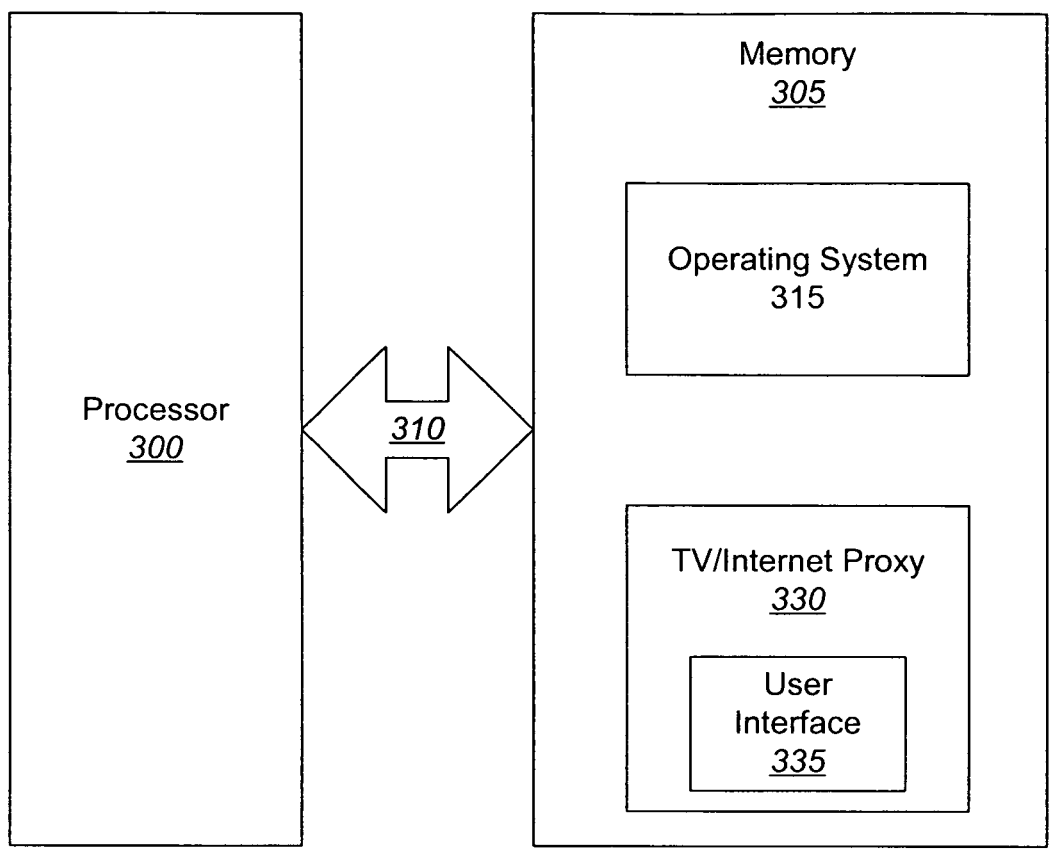
FIG. 3 is a block diagram that illustrates a software/hardware architecture for displaying content on a television monitor from a source other than a television signal source in accordance with some embodiments of the present invention.

FIG. 3 illustrates a processor 300 and memory 305 that may be used in embodiments of video control modules, such as the video control module 110 of FIG. 1 in accordance with some embodiments of the present invention. The processor 300 communicates with the memory 305 via an address/data bus 310. The processor 300 may be, for example, a commercially available or custom microprocessor. The memory 305 is representative of the one or more memory devices containing the software and data used for providing a window interface on a television monitor for displaying content from a source other than a television signal source in accordance with some embodiments of the present invention. The memory 305 may include, but is not limited to, the following types of devices: cache, ROM, PROM, EPROM, EEPROM, flash, SRAM, and DRAM.

As shown in FIG. 3, the memory 305 may contain up to two or more categories of software and/or data: an operating system 315 and a TV/Internet Proxy module 330. The operating system 315 generally controls the operation of the video control module 110. In particular, the operating system 315 may manage the video control module's software and/or hardware resources and may coordinate execution of programs by the processor 300. The TV/Internet Proxy 330 may be configured to act as a translation and intelligent transfer agent. According to some embodiments of the present invention, the TV/Internet proxy module 330 may listen to an IP network connection to await a television display request. The data sent may be processed by the TV/Internet proxy module 330 and integrated into the video stream for a television monitor so that the data is displayed in the appropriate window, such as a crawl screen, closed caption area, and/or PIP area. The TV/Internet Proxy module 330 may further comprise a user interface module 335 that may be used to operate the television, provide input to an application, and/or execute an application that is accessed, for example, through the data processing system 140 of FIG. 2.

Although FIG. 3 illustrates exemplary hardware/software architectures that may be used in video control modules, such as the video control module 110 of FIG. 1, it will be understood that the present invention is not limited to such a configuration but is intended to encompass any configuration capable of carrying out operations described herein. Moreover, the functionality of the data processing system 200 of FIG. 2 and the hardware/software architecture of FIG. 3 may be implemented as a single processor system, a multi-processor system, or even a network of stand-alone computer systems, in accordance with various embodiments of the present invention.

Computer program code for carrying out operations of data processing systems discussed above with respect to FIG. 2 and/or video control modules discussed above with respect to FIG. 3 may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described herein with reference to flowchart and/or block diagram illustrations of methods, systems, and computer program products in accordance with exemplary embodiments of the invention. These flowchart and/or block diagrams further illustrate exemplary operations for displaying content from a source other than the television signal source in a window on a television monitor, in accordance with some embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Exemplary operations for displaying Internet content on a television crawl screen, close caption area, and/or PIP are will now be described with reference to FIGS. 4 and 1. Operations begin at block 400 where the video control module 110 displays content on the television monitor 130 from the television signal source 120. This content may be a television show, movie, etc. At block 410, the data processing system 140 under control of the television window manager 160 may provide additional content that is obtained via the network 150 or is stored on the data processing system 140, for example. This additional content is displayed is provided to the video control module 110 and displayed on the monitor 130 under the control of the TV/Internet Proxy 330 of FIG. 3. Advantageously, a user may watch a television program, for example, while still being able to view content from a source other than the signal source for the television program. This content from a source other than the signal source for the television program may include, but is not limited to, audio content (e.g., a voice mail), video content (e.g., a video file, a digital video disc, etc.), a World Wide Web (WWW) page, and/or an electronic mail/message.

In accordance with various embodiments of the present invention, the television window manager 160 of FIG. 1 may be configured to detect the occurrence of an event, which may be user defined, and then provide content to the video control module 110 for display upon occurrence of the event. For example, a user may define an event corresponding to a change of score in a sporting event. Thus, every time one team in the sporting event scores, the data processing system 140 obtains the score information from the network 150 and then provides the score information to the video control module 110 for display on the monitor 130.

In accordance with other embodiments of the present invention, the TV/Internet Proxy 330 of FIG. 3 may crawl content obtained from the data processing system 140 across a window on the monitor 130. In other embodiments, the TV/Internet Proxy 330 may display content obtained from the data processing system 140 using Really Simple Syndication (RSS) as a format.

In still other embodiments of the present invention, the user interface 335 of FIG. 3 may be receptive to input from a user via an interface associated with the television window for displaying the content from the data processing system 140. Action may be taken based on the user's input. For example, a user may wish to participate in an Internet auction. A current status of the auction may be displayed on the monitor 130 via the data processing system 140 and the video control module 110. A user may input a bid through the interface on the monitor 130 provided by the user interface module 335 of FIG. 3. This input may be sent back to auction Web site via the data processing system 140. In general, various actions may be performed based on a user's input via the interface on the monitor 130 provided via the user interface module 335. For example, a user may operate a control on the television, provide an input to an application or execute an application that resides either on the video control module 110, the data processing system 140, and/or in the network 150.

Figure 4:
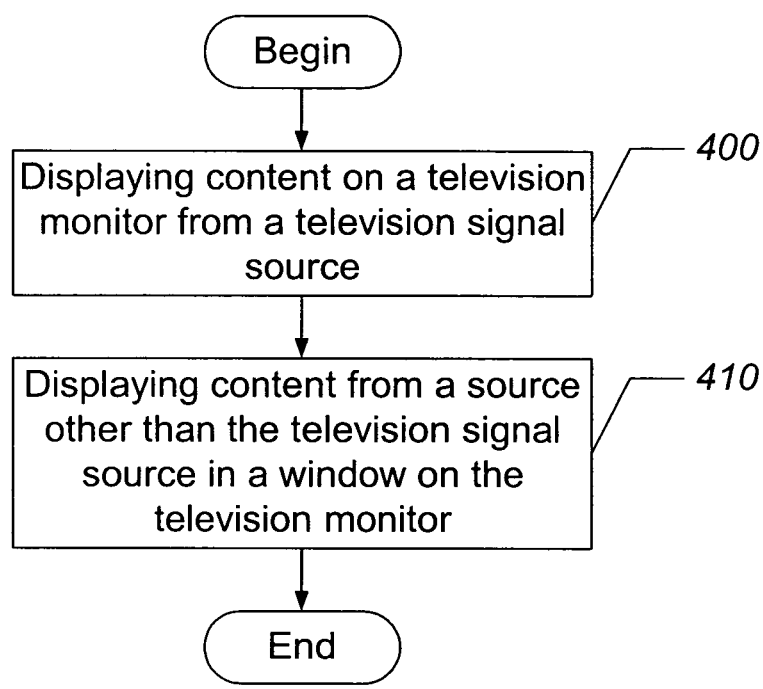
FIGS. 4 and 8 are flowcharts that illustrates operations for displaying content on a television monitor from a source other than a television signal source in accordance with some embodiments of the present invention.

The flowcharts of FIGS. 4 and 8 illustrate the architecture, functionality, and operations of some embodiments of methods, systems, and computer program products for displaying content from a source other than a television signal source, such as the Internet, in a window on a television monitor. In this regard, each block represents a module, segment, or portion of code, which comprises one or more executable instructions for implementing the specified logical function(s). It should also be noted that in other implementations, the function(s) noted in the blocks may occur out of the order noted in FIG. 4. For example, two blocks shown in succession may, in fact, be executed substantially concurrently or the blocks may sometimes be executed in the reverse order, depending on the functionality involved.

Figure 5:
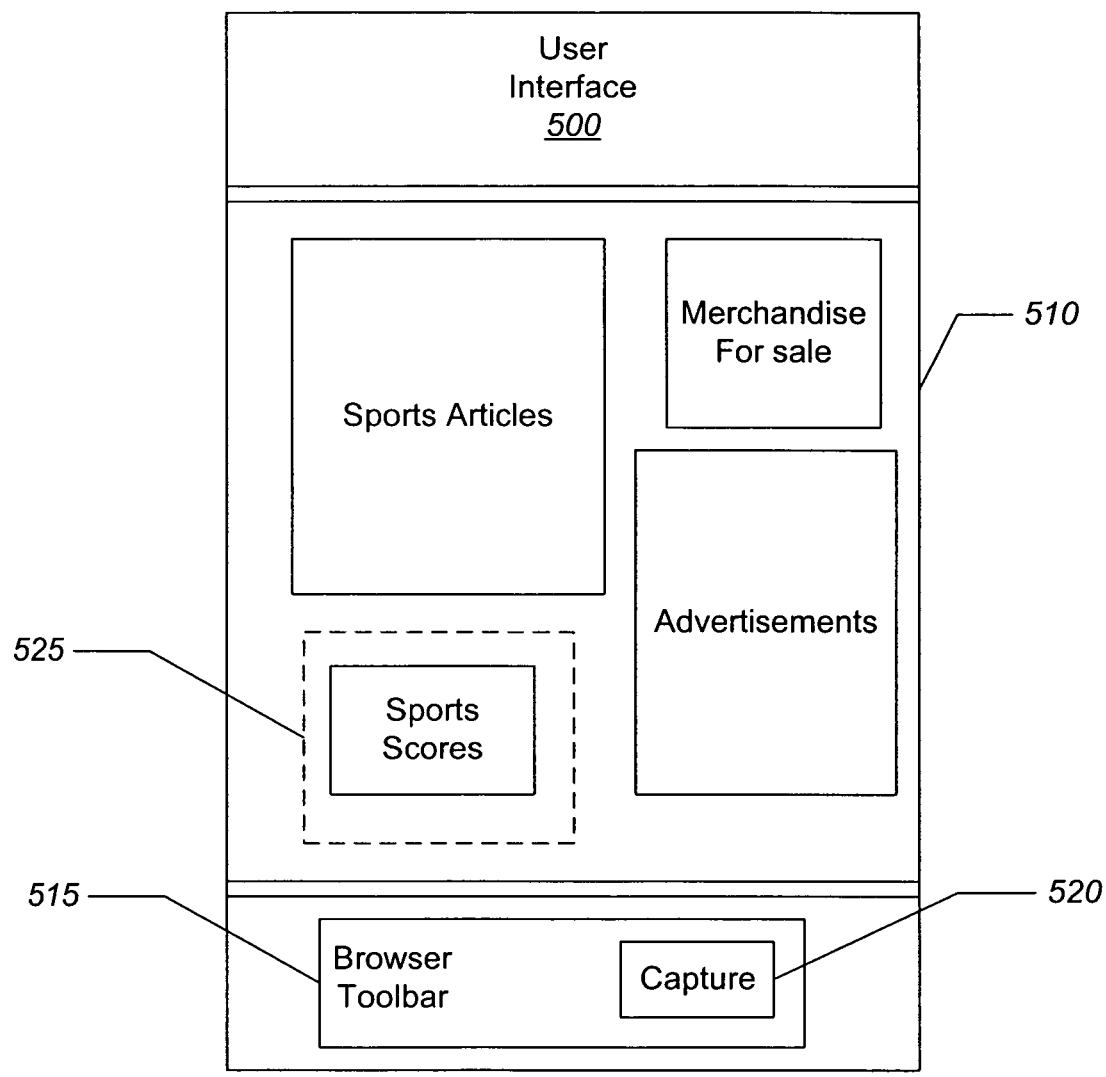
FIGS. 5 and 6 are block diagrams that illustrate user interfaces for selecting content from a source other than a television signal source in accordance with some embodiments of the present invention.

Some embodiments of the present invention may be illustrated by way of example. Referring to FIG. 5, an exemplary user interface 500 is shown that may be provided, for example, by the TV window manager 216 of FIG. 2 to allow a user to select portions of a Web page to be displayed in a window, such as a crawl screen, closed caption area, and/or PIP area of a television display. As shown in FIG. 5, an Internet browser is used to display a Web page 510 corresponding to a sports-related Web site. The Web page 510 includes the display of sports articles, sports scores, merchandise for sale, and advertisements. A toolbar 515 may be embodied as a plug-in for the browser to allow the user to select aspects of the Web page 510 to be displayed in a window of a television display. The toolbar 515 includes a capture button 520 that may be used to select content from the Web page 510 for display on the television window. In the example shown in FIG. 5, the capture button 520 is used to invoke a tool that is used to place a capture box 525 around the sports scores. Once selected, the TV window manager 216 of FIG. 2 may forward the sports scores to the TV/Internet proxy 330 on the video control module 110 for display in a window on the television display. Advantageously, a user can continue to watch a program on television without the need to access another device and/or leave the room to access the Internet to check on the latest sports scores.

Figure 6:
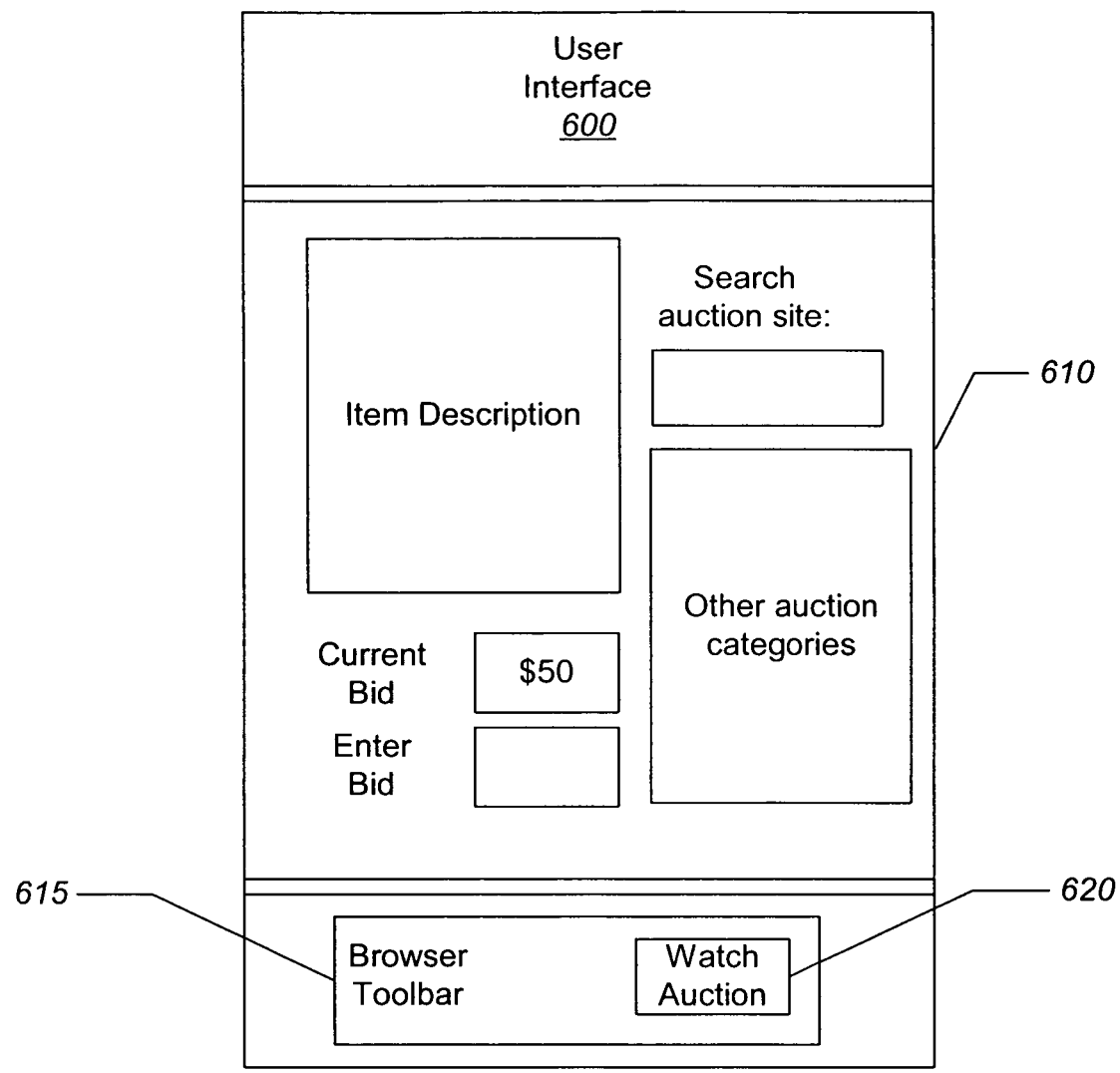

Referring to FIG. 6, an exemplary user interface 600 is shown that that may be provided, for example, by the TV window manager 216 of FIG. 2 in accordance with further embodiments of the present invention. In this example, an Internet browser is used to display a Web page 610 corresponding to an auction Web site. The Web page 610 includes the display of the item description, a field to enter a current bid for the item, a field that displays the current bid for the item, a field to search the auction site, and a list of other auction categories. A toolbar 615 may be embodied as a plug-in for the browser to allow the user to select aspects of the Web page 610 to be displayed in a window of a television display. The toolbar 615 includes a watch auction button 620 that may be used to select the current bid from the Web page 610 for display on the television window. Moreover, the watch auction button may trigger the TV window manager 160 to communicate with the TV/Internet proxy module 330 that an Internet auction is to be displayed on the television display such that both the current bid for the item along with an interface to submit a bid is displayed on the television display. Similar to the example of FIG. 5, a user can continue to watch a program on television without the need to access another device and/or leave the room to participate in an Internet auction.

Figure 7:
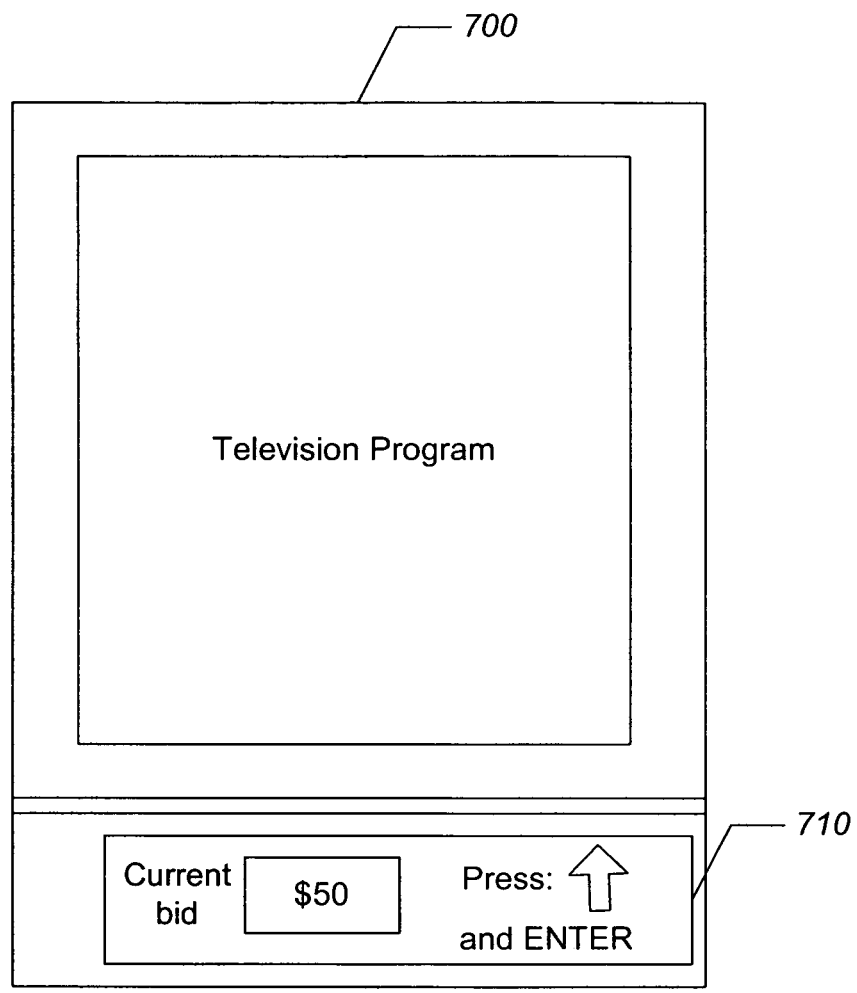
FIG. 7 is a block diagram that illustrates a user interface for providing input responsive to display of content from a source other than a television signal source in accordance with some embodiments of the present invention.

Referring to FIG. 7, an exemplary user interface 700 for the Internet auction example of FIG. 6 is shown that may be provided, for example, the user interface module 335 of FIG. 3. A television program is shown on the television display with auction information displayed in a closed caption area 710. The auction information includes the current bid, which may be provided, for example, by an applet that runs on the data processing system 140. The closed caption area 710 includes an interface that may allow a user to enter a bid for the item by using the arrow key on the remote control for the television. For example, to increase the arrow key on the remote control can be used to increase the bid to a desired value and the bid may be submitted by pressing the enter key on the remote control. The bid may be forwarded to the auction Web site by way of the data processing system 140 of FIG. 1. Thus, the user interface module 335 of FIG. 3 may allow a user to not only view, but also participate in an Internet auction while simultaneously watching a television program. Moreover, the input to the Internet auction may be provided through a television remote control.

Many variations and modifications can be made to the preferred embodiments without substantially departing from the principles of the present invention. All such variations and modifications are intended to be included herein within the scope of the present invention, as set forth in the following claims.

That which is claimed:

1. A method, comprising:
   receiving, by a video control module comprising a processor, first content from a television signal source;
   presenting, by the video control module, the first content on a display device;
   receiving, by the video control module, web page content from a computer device;
   presenting, by the video control module, the web page content on the display device;
   identifying, by the video control module, second content and second information associated with the second content from the web page content via a capture box arranged on the display device;

receiving, by the video control module, the second content and the second information by way of a wireless connection in response to a detected occurrence of a user-defined event comprising a change in data associated with the second content, wherein the second content is generated by a source other than the television signal source, and wherein the second information defines a first window on the display device for presenting the second content;

presenting, by the video control module, the second content in the first window on the display device such that the first content from the television signal source and the second content are simultaneously displayed on the display device, wherein the second content comprises auction information;

receiving, by the video control module, a bid associated with the auction information;

transmitting, by the video control module, the bid to the source other than the television signal source;

presenting, by the video control module, a set-up menu from the computer device for selecting a location of a plurality of locations for the first window to be presented on the display device and for selecting a size of a plurality of sizes for the first window to be presented on the display device, wherein the set-up menu comprises a first option for beginning or ending presentation of Internet-sourced content at the display, wherein the set-up menu comprises a second option for adding and subtracting the Internet-sourced content at the display, and wherein the set-up menu comprises a third option for showing the Internet-sourced content in a pop window before presentation at the display;

receiving, by the video control module, a location selection and a size selection by way of the set-up menu;

transmitting, by the video control module, the location selection and the size selection to the computer device; and receiving, by the video control module, the second content configured for presenting the second content in the first window of the display device according to the location selection and the size selection.

2. The method of claim 1, wherein the user-defined event comprises one of a sports score change, a stock quote change, an auction bid price change, or a ticket availability change for a ticketed event.

3. The method of claim 1, wherein the user-defined event is defined by the computing device, and wherein the presenting of the web page content on the display device is responsive to user input that identifies a portion of a web site to be displayed.

4. The method of claim 1, comprising crawling, by the video control module, the second content across the window.

5. The method of claim 1, comprising displaying, by the video control module, the second content using simple syndication as a format.

6. The method of claim 1, comprising:
receiving, by the video control module, input via an interface associated with the window on the display device; and
performing, by the video control module, an action based on the input that is received.

7. The method of claim 5, wherein performing the action comprises one of operating a control on the display device, providing the input to an application, or executing the application.

8. A computing device, comprising:
a processor; and
a memory that stores executable instructions that, when executed by the processor, facilitate performance of operations, comprising:
transmitting a set-up menu to a set-top box for selecting a location of a plurality of locations for a first window to be presented on a display device of the set-top box and for selecting a size of a plurality of sizes for the first window to be presented on the display device, wherein the set-up menu comprises a first option for beginning or ending presentation of Internet-sourced content at the display device, wherein the set-up menu comprises a second option for adding and subtracting the Internet-sourced content at the display device, and wherein the set-up menu comprises a third option for showing the Internet-sourced content in a pop window before presentation at the display device;

receiving a location selection and a size selection from the set-top box according to the set-up menu;

identifying a selection of first content from a source other than a television signal source, wherein the identifying is by a capture box arranged on a display device;

receiving the first content from the source other than the television signal source;

transmitting the first content to a set-top box by way of a wireless connection, wherein the first content comprises auction information and wherein the first content is configured for presentation in the first window of the display of the set-top box according to the location selection and the size selection;

receiving from the set-top box a bid associated with the auction information; and transmitting the bid to the source other than the television signal source.

9. The computing device of claim 8, wherein the processor performs operations comprising detecting an occurrence of a user-defined event comprising a change in data associated with the first content and further comprising one of a sports score change, a stock quote change, an auction bid price change, or a ticket availability change for a ticketed event.

10. The computing device of claim 8, wherein the set-top box is operable to present a crawl of the first content across a window of the display device.

11. The computing device of claim 8, wherein the first content conforms to a simple syndication format.

12. The computing device of claim 8, wherein the set-top box is operable to present a user interface configured to receive input associated with the window of the display device and to perform an action based on the input that is received.

13. A computer-readable storage device, comprising executable instructions which, when executed by a processor, facilitate performance of operations comprising:
receiving first content from a television signal source;
presenting the first content on a display device;
receiving web page content received from a computer device;
presenting the web page content on the display device;
identifying second content and second information associated with the second content from the web page content via a capture box arranged on the display device;
receiving the second content and the second information by way of a wireless connection, wherein the second content is generated by a source other than the television signal source, wherein the second information enables defining a window on the display device for presenting the second content;

presenting the second content in the window on the display device such that the first content and the second content are simultaneously displayed on the display device, wherein the second content comprises auction information;

receiving a bid associated with the auction information;

transmitting the bid to the source other than the television signal source presenting a set-up menu from the computer device for selecting a location of a plurality of locations for a first window to be presented on the display device and for selecting a size of a plurality of sizes for the first window to be presented on the display device, wherein the set-up menu comprises a first option for beginning or ending presentation of Internet-sourced content at the display, wherein the set-up menu comprises a second option for adding and subtracting the Internet-sourced content at the display, and wherein the set-up menu comprises a third option for showing the Internet-sourced content in a pop window before presentation at the display;

receiving a location selection and a size selection by way of the set-up menu;

transmitting the location selection and the size selection to the computer device; and receiving from the computer device the second content configured for presenting the second content in the first window of the display device according to the location selection and the size selection.

14. The computer-readable storage device of claim 13, comprising executable instructions which when executed by the processor cause the processor to perform operations further comprising detecting an occurrence of a user-defined event comprising one of a sports score change, a stock quote change, an auction bid price change, or a ticket availability change for a ticketed event.

15. The computer-readable storage device of claim 13, comprising executable instructions which when executed by the processor cause the processor to further perform operations comprising presenting a crawl of the second content across the window.

16. The computer-readable storage device of claim 13, comprising executable instructions which when executed by the processor cause the processor to further perform operations comprising:

receiving input via an interface associated with the window presented at the display device; and performing an action based on the input that is received.

17. The method of claim 1, wherein the computer device is operable to perform operations comprising:

receiving a plug-in that displays a content selection menu on an Internet Protocol network browser on the display device; and establishing a communication session over the Internet Protocol network browser.

18. The computing device of claim 8, wherein the source other than the television signal source comprises an Internet source, and wherein the processor, responsive to executing the executable instructions, further performs operations comprising:

receiving a plug in module for an Internet Protocol network browser for presenting a content selection menu on an Internet Protocol network browser;

receiving a selection of the first content via the content selection menu; and establishing a communication session at the Internet Protocol network browser.

* * * * *